United States Patent [19]

Lescaut

[11] Patent Number: 4,953,651
[45] Date of Patent: Sep. 4, 1990

[54] COUPLING ARRANGEMENT IN POWER STEERING FOR VEHICLES

[75] Inventor: Emmanuel Lescaut, Les Clayes Sous Bois, France

[73] Assignees: Automobiles Peugeot; Automobile Citroen, both of France; a part interest

[21] Appl. No.: 76,023

[22] Filed: Jul. 21, 1987

[30] Foreign Application Priority Data

Jul. 25, 1986 [FR] France .................. 86 10851

[51] Int. Cl.⁵ .............................. B62D 5/09
[52] U.S. Cl. .................... 180/132; 91/375 A;
        180/79.1; 180/142; 180/149
[58] Field of Search .......... 180/132, 142, 141, 79.1,
                                180/79, 149; 91/375 A

[56] References Cited

U.S. PATENT DOCUMENTS

| 4,481,866 | 11/1984 | Matouka | 91/375 A |
| 4,583,610 | 4/1986 | Hasegawa | 180/143 |

FOREIGN PATENT DOCUMENTS

| 207604 | 1/1987 | European Pat. Off. | 180/142 |
| 1816997 | 8/1969 | Fed. Rep. of Germany. | |
| 2216162 | 8/1974 | France. | |
| 2365472 | 4/1978 | France. | |
| 2478004 | 9/1981 | France | 180/79.1 |
| 2575989 | 7/1986 | France. | |
| 221771 | 12/1983 | Japan | 180/79 |
| 2030943 | 4/1980 | United Kingdom | 180/132 |
| 2191159 | 12/1987 | United Kingdom | 180/132 |

*Primary Examiner*—Mitchell J. Hill
*Attorney, Agent, or Firm*—Steinberg & Raskin

[57] ABSTRACT

A power-assisted steering device for automotive vehicles having a power-assisted steering valve provided with a rotor, with a tubular sleeve made rotationally fast with a member for mechanically operating the steering mechanism and with a resilient connecting device for rotary drive interposed between the steering shaft and the operating member and including a bar shaped as a connecting rod, the end of which that is opposite to that made rotationally fast with the operating member being connected to the steering shaft through a resilient coupling arrangement located outside of the assistance valve, the degree of assistance of which is selectively variable.

7 Claims, 2 Drawing Sheets

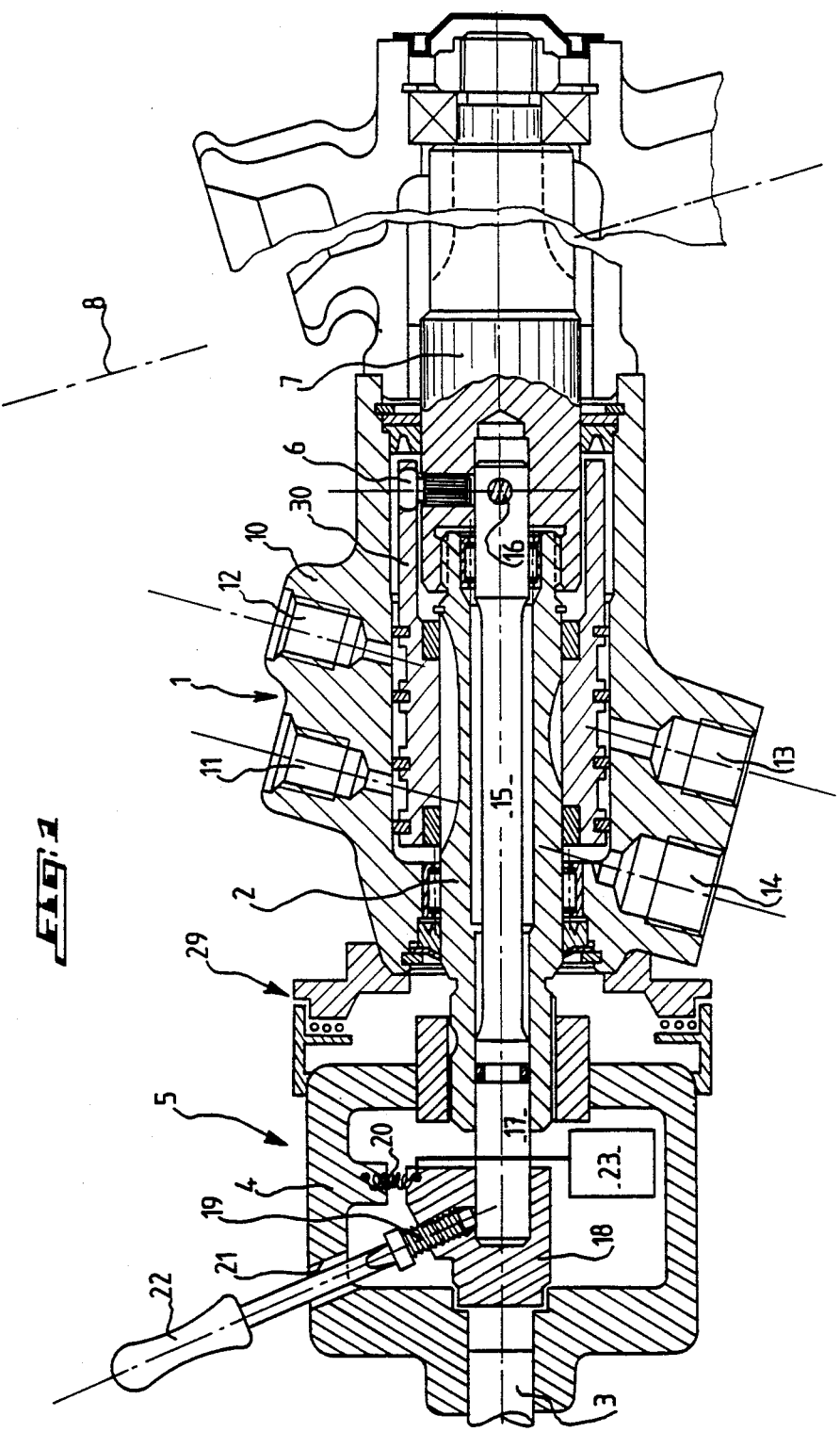

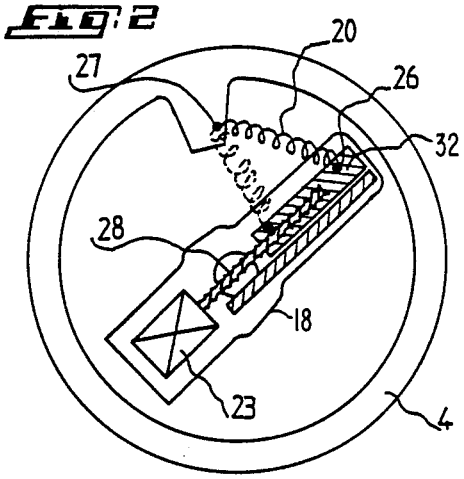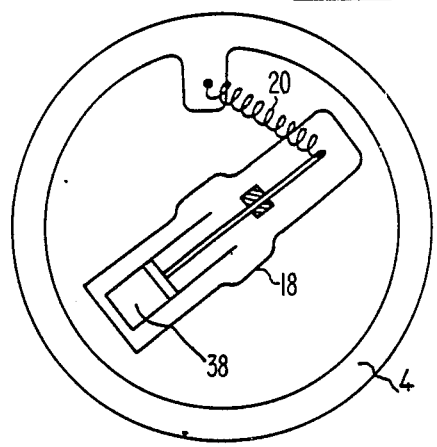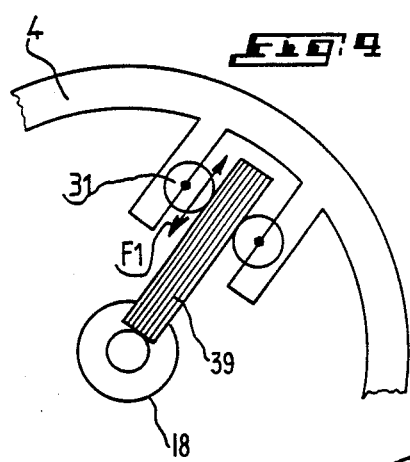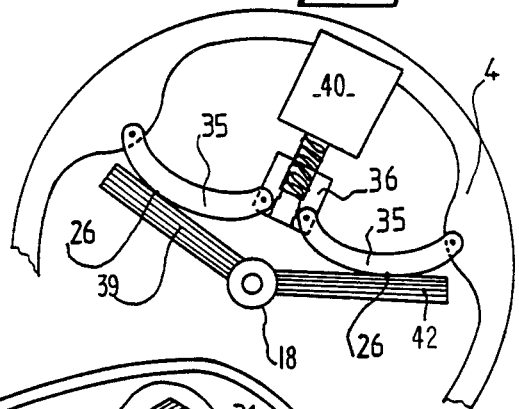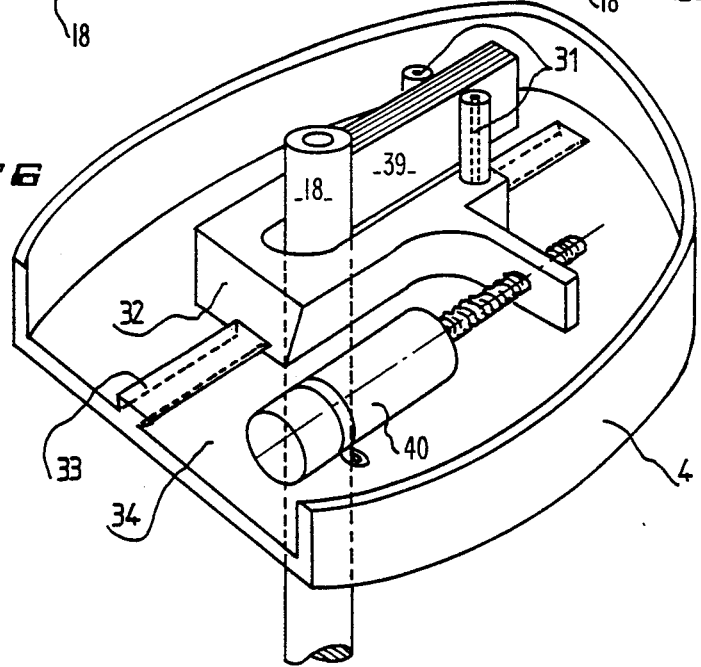

COUPLING ARRANGEMENT IN POWER STEERING FOR VEHICLES

BACKGROUND OF THE INVENTION

The present invention relates essentially to a power-assisted steering device for automotive vehicles, of the kind comprising a power-assisted steering valve provided with a rotor made rotationally fast with the steering shaft, with a stationary body forming a box or case, with a tubular sleeve positioned in the box or case in coaxial relationship about the rotor and made rotationally fast with a member for mechanically operating the steering mechanism and with a resilient rotary drive connecting device interposed between the steering shaft and the mechanical operating member, which comprises a bar or rod extending along the centreline axis of the valve and made rotationally fast at one end with said mechanical operating member.

In known power-assisted steering devices of this type, the bar or rod of the resilient connecting device is shaped as a torsion bar the end of which that is opposite to that secured to the mechanical operating member is connected through a cotter pin to the steering shaft, hence to the valve rotor. To vary the extent of power assistance of the steering valve, the flow rate or the pressure of the fluid flowing in the circuit of the valve is varied.

These measures to vary the extent or degree of power assistance however exhibit inconveniences. Thus, the decrease in the flow rate may result in some idleness or in a heaviness of the steering and in some softness between the steering wheel angle and the angle of the wheels. Consequently, the variation in the flow rate is limited and the variation in the powered assistance is restricted too. The variation in the degree or extent of assistance through variation in the pressure would meet with difficulties in varying the pressure in an accurate and stable manner in accordance with the speed and a softness between the angle of the steering wheel and the angle of the wheels may occur.

SUMMARY OF THE INVENTION

The main object of the present invention is to provide a power-assisted steering device which would permit a reliable and drawback-free variation in the degree of assistance of the valve.

To reach that aim, the power-assisted steering device according to the invention is characterized in that the bar of the resilient connecting device is shaped as a connecting rod and in that its end opposite to that rotationally made fast with the mechanial operating member, is coupled to the steering shaft through a resilient coupling arrangement located outside of the assistance valve.

According to a characterizing feature of the invention, the resilient coupling arrangement comprises a stator member secured to the free end, i.e. opposite to the end integral with the mechanical operating member, of the connecting rod, a rotor member secured to the rotor of the valve and to the steering shaft and resilient means mounted between said rotor and said connecting stator, allowing a relative rotary motion between this stator and this rotor.

According to an advantageous characterizing feature of the invention, the resilient connecting means are adapted to allow a variation in the torsional flexibility between the rotor and the connecting stator.

According to another advantageous characterizing feature of the invention, the resilient connecting means are formed of one or several springs anchored with its ends to the rotor and to the stator, respectively, advantageously so as to extend radially, one of the anchoring points and preferably that one which is toward the stator being advantageously displaceable to provide for the variation in the flexibility.

According to still another advantageous characterizing feature of the invention, the resilient connecting means are formed of one or several bending strips or blades mounted between the stator and the connecting rotor, the anchoring of one end of the bending strips or blades being advantageously formed of two rollers mounted for rotary motion on a movable support.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting examples only illustrating several presently preferred specific embodiments of the invention and wherein:

FIG. 1 is a view in axial section of a power-assisted device according to the present invention;

FIGS. 2 and 3 diagrammatically show a first kind of embodiment of the resilient connecting means according to the present invention;

FIGS. 4 and 5 diagrammatically show a second kind of embodiment of the resilient connecting means according to the invention; and FIG. 6 is a perspective view of an embodiment of the resilient connecting means diagrammatically shown in FIG. 4.

DESCRIPTION OF THE PREFERRED EMBODIMENTS

Referring to FIG. 1, there is seen a power-assisted steering device essentially comprising a power-assisted steering valve 1 of a structure known per se, the rotor 2 of which is connected to the steering shaft 3 through the agency of a rotor member 4 forming part of resilient coupling arrangement 5 which will be described later in detail and the sleeve 30 of which is secured rotationally to a snug or pin 6 with a gear 7 forming a member on the mechanical operation of the steering mechanism and meshing for that purpose with a toothed rack. The centreline axis of that toothed rack is shown at 8. The valve 1 further comprises a body 10 forming a box or case. As known per se, the rotor 2 and the sleeve 30 comprise passage-ways which form two distinct flow circuits for a liquid supplied by a pump and flowing through the valve, each one of these circuits being connected to one of the chambers of a double-acting actuator, ram or jack of the servo-assisted steering device. In FIG. 1, the reference numerals 11 and 12 designate the working ports adapted to be connected to the chambers of the hydraulic actuator not shown. The ports 13 and 14 form inlet and outlet or return ports, respectively, for the fluid circulated by the pump (not shown).

A connecting rod 15 is connected with one end by a cotter pin or dowel 16 to the gear 7 and with the other end to the steering shaft 3 hence to the valve rotor 2 through the medium of the resilient coupling arrangement 5 for rotary drive. It is apparent that the connecting rod 15 extends along the centreline axis of the power-assisted steering valve 1 like the torsion bar customarily used in such a valve.

In the case of the invention, that end 17 which is opposite the end secured rotationally to the gear 7 projects outwards from the valve rotor 2. The resilient coupling arrangement 5 comprises a stator 18 secured and indexed onto the end 17 through a set or lock screw 19, the aforesaid rotor 4 which is secured and indexed onto the valve rotor 2 and resilient rotary drive means diagrammatically shown at 20 and arranged between the stator 18 and the connecting rotor 4. The set or lock screw 19 is accessible from the outside through an adjustment hole 21 to be operated by means of a suitable tool 22. The reference numeral 23 designates a control device permitting varying the flexibility between the rotor 4 and the stator 18 of the resilient coupling arrangement 5.

Referring to FIGS. 2 to 6, several embodiments of the resilient means 20 for the rotary drive will be described hereinafter.

On FIG. 2, this means 20 are formed by one or several helical coil springs interposed between the rotor 4 and the stator 18. In the example shown, the spring is anchored at on the rotor 4 and at 26 on a carriage 32 mounted for radial motion on the stator 18 under the action of the drive device 23. On FIG. 2, this device consists of a motor rotating a screw threaded spindle 28 whereas, according to FIG. 3, the control device consists of a hydraulic actuator or an electro-magnet 38. Any other suitable means may of course be used.

On FIG. 2, the resilient means for rotary drive 20 and its anchoring point 26 are shown in the position of utmost stiffness. In broken lines has been shown the resilient means 20 in the position of greatest flexibility of the resilient coupling arrangement 5. The position of the anchoring point 26 may be made dependent of the speed of the vehicle. It is indeed possible to obtain a voltage, a number in binary figures, a pressure or a current proportional to the speed which would serve as a criterion for the variation in the position of the anchoring point 26. The drive device 23 may be fed with energy by means of a revolving collector 29 (FIG. 1).

According to FIGS. 4 and 5, the resilient means 20 for rotary drive are formed of one or several bending strips or blades 39, 42. One end of each bending strip is secured rotationally to the end 17 of the connecting rod 15. The other end is held in the embodiment of FIG. 4 by two rotary rollers 31 the axes of which are radially displaceable with respect to the connecting rod 15 in the direction of the arrow F1. As shown in FIG. 6, both rollers 31 associated with a bending strip or blade 39 are mounted for rotary motion on a support made as a carriage 32 which is radially slidable with respect to the connecting rod 17 on a guide rail 33 of a dove-tail-like shape which extends radially on the bottom 34 of the rotor 4. The device 40 for driving the carriage 32 is also mounted on the bottom 34 of the rotor.

On FIG. 5, two bending strips are provided the anchoring points 26 of which are variable through the medium of cams 35 pivotally connected with one end to the rotor 4 and with the other end to a carriage 36 radially displaceable with respect to the stator under the action of the control 41. This control may be a motor, a hydraulic actuator or an electro-magnet or also any other suitable means.

It is easily understood that the variation in the position of one of the two anchoring points of the resilient means 39 for rotary drive through the radial displacement of this point permits to obtaining a variation in the flexibility of the power-assisted steering device according to the invention. The invention offers substantial advantages. The device according to the invention permits varying the flexibility of the torsion bar of a conventional power-assisted steering valve. It is thus known how to make a steering device, the assistance to which would vary radially between two limits, one of which may be fully mechanical and the other one may be almost fully power-assisted. Morover, it is possible to use a conventional proportional hydraulic valve. It would indeed be interposed between the existing valve and the steering column. The only modification of the conventional valve would consist in a lengthening or extension and in a possible modification of the diameter of the torsion bar of the valve. It will naturally be necessary for that purpose to omit the cotter pin or dowel provided in the conventional valve for the connection between the rotor of the valve and the torsion bar. A third advantage is that the device according to the invention may be mounted on an existing vehicle in an optional manner and neither affects nor calls again in question the vehicle architecture, the valve timing, or the flexibility thereof. It is naturally necessary that the device be itself a safety one and that there be a true stoppage or abutment between the rotor and the stator of the resilient coupling arrangment at the end of the stroke of the angle of relative rotation of both parts.

The invention is naturally not limited to the embodiments which have been described.

Thus, the anchoring joints 26 could well not be radially displaceable, the carriage 32 being arranged in any suitable manner. The bending strips or blades 39 could also not be disposed radially.

What is claimed is:

1. A power-assisted steering device for an automotive vehicle, comprising
    a power-assisted steering valve having a rotor rotatively coupled to a steering shaft of the vehicle,
    a stationary body comprising a box including said rotor,
    a tubular sleeve located within the box, coaxially surrounding said rotor and rotatively coupled to a steering mechanism operating member,
    a connecting rod coaxially located within said valve and having an end located within said valve which is rotatively coupled to said operating member and an opposite end, and
    a resilient coupling means interconnecting said steering shaft and said opposite end of said connecting rod for allowing said steering shaft to resiliently rotate with respect so said connecting rod.

2. A device according to claim 1, wherein said resilient coupling means comprises
    a stator member secured to said opposite end of said connecting rod,
    a rotor member secured rotatably to said valve rotor and to said steering shaft, and
    resilient connecting means mounted between said rotor and stator members of said coupling means and adapted to allow a resilient relative rotary movement between said stator and rotor members in order to allow a torsional flexibility of the connection therebetween.

3. A device according to claim 2, wherein said resilient coupling means allows a variation in the torsional flexibility of the connection between said rotor and stator members.

4. A device according to claim 3, wherein said rotor and said stator members are arranged coaxially and an annular space is formed between them,
- wherein said resilient connecting means comprises at least one spring means located within said annular space and secured by its ends to said rotor and said stator members respectively, and
- at least one of said resilient coupling means being movable for varying the distance between said respective resilient coupling means in order to ensure said variation in flexibility.

5. The device of claim 4, wherein said resilient coupling means associated with said stator member are movable.

6. A device according to claim 3,
- wherein said resilient connecting means comprises at least one spring means having two ends and secured by its said two ends to said rotor and said stator members respectively, and
- at least one of said resilient coupling means being movable for varying the distance between said respective resilient coupling means in order to ensure said variation and flexibility.

7. A device according to claim 1, wherein the end of said bar which is opposite to the end rotatably coupled to said operating member is mounted outside of said valve and carries said stator member of said resilient coupling means.

* * * * *

UNITED STATES PATENT AND TRADEMARK OFFICE
CERTIFICATE OF CORRECTION

PATENT NO. : 4,953,651
DATED : September 4, 1990
INVENTOR(S) : Emmanuel LESCAUT

It is certified that error appears in the above—identified patent and that said Letters Patent is hereby corrected as shown below: TITLE PAGE:

[73] Assignees: AUTOMOBILES PEUGEOT; AUTOMOBILES CITROEN, both of France; a part interest Signed and Sealed this Second Day of July, 1991

Attest:

HARRY F. MANBECK, JR.

*Attesting Officer*     *Commissioner of Patents and Trademarks*